United States Patent [19]

Thomas et al.

[11] 4,160,483

[45] Jul. 10, 1979

[54] METHOD OF TREATING A WELL USING FLUOBORIC ACID TO CLEAN A PROPPED FRACTURE

[75] Inventors: Ronnie L. Thomas, Tulsa, Okla.; Frederick A. Suhy, Mobile, Ala.

[73] Assignee: The Dow Chemical Company, Midland, Mich.

[21] Appl. No.: 927,000

[22] Filed: Jul. 21, 1978

[51] Int. Cl.$^2$ .................................................. E21B 43/27
[52] U.S. Cl. ................................. 166/307; 166/280; 252/8.55 C
[58] Field of Search ............... 166/307, 308, 281, 282, 166/280; 252/8.55 C, 8.55 R

[56] References Cited

U.S. PATENT DOCUMENTS

| | | | |
|---|---|---|---|
| 2,300,393 | 11/1942 | Ayers, Jr. | 252/8.55 C |
| 2,663,689 | 12/1953 | Kingston et al. | 166/307 X |
| 2,664,165 | 12/1953 | Bond | 252/8.55 C X |
| 2,717,876 | 9/1955 | Menaul | 252/8.55 C |
| 2,785,752 | 3/1957 | Bond et al. | 166/307 X |
| 3,481,401 | 12/1969 | Graham | 166/307 X |
| 3,842,911 | 10/1974 | Knox et al. | 166/307 |
| 3,891,566 | 6/1975 | Crowe | 252/8.55 R |
| 4,028,257 | 6/1977 | Thompson | 252/8.55 C |

*Primary Examiner*—Stephen J. Novosad
*Attorney, Agent, or Firm*—G. H. Korfhage

[57] ABSTRACT

The permeability of the prop pack in a subterranean fracture containing a propping agent is improved by contacting the propping agent with fluoboric acid. The fluoboric acid slowly forms hydrolysis products, including hydrofluoric acid and hydroxyfluoboric acid, which react with and stabilize clays and other fines in the prop pack, thereby improving its permeability. Because the fluoboric acid hydrolyzes slowly, it can be injected deep into the fracture extremities before significant spending of the acid occurs.

5 Claims, No Drawings

METHOD OF TREATING A WELL USING FLUOBORIC ACID TO CLEAN A PROPPED FRACTURE

I. BACKGROUND OF THE INVENTION

A. Field of the Invention

The invention is a method of treating a subterranean formation penetrated by a wellbore. More specifically, it relates to improving fracture conductivity of a fracture in such a formation which contains a propping agent.

B. Description of the Prior Art

It is common practice to hydraulically fracture subterranean formations containing valuable fluids such as hydrocarbons. In a typical fracturing treatment, a particulate propping agent, e.g. sand, glass beads, sintered bauxite, nut shells, zirconia, alumina, and the like, is placed in the fracture to keep the fracture at least partially propped open. The proppant pack is frequently less permeable than it might be due to the presence of siliceous fines and clay platelets dispersed in the pack, resulting in less than optimum fracture conductivity. Such fines and clays may be initially present in the proppant when the proppant is placed in the fracture, or may migrate into the proppant pack from the formation as fluid is produced from the formation. Regardless of the source of the fines, and regardless of whether the proppant pack is a newly placed pack or one which has been in service for a period of time, it is desirable to increase the fracture conductivity by cleaning the proppant pack. A fluid used for such a treatment must be able to react with the fines and clays sufficiently to increase the permeability of the pack without attacking the principal propping agent to such an extent that the strength of the pack is materially reduced. Conventional mud acid (e.g. 12% aqueous HCl and 3% aqueous HF) has been used for this purpose, but has several disadvantages. Mud acid spends rapidly and therefore cannot penetrate deeply into the extremities of the fracture. Also, it provides no clay stabilization to undissolved particles, and can cause sloughing of the fracture face in certain formations. Another fluid which has been proposed in the past for such purpose is phosphoric acid containing some ammonium bifluoride.

Fluoboric acid has been proposed for various well treatments in the past, but so far as is presently known, fluoboric acid has never been proposed for use in cleaning a proppant pack. Prior art utilizing fluoboric acid in well treatments includes Ayers, Jr., U.S. Pat. No. 2,300,393; Bond, et al., U.S. Pat. No. 2,425,415; Kingston, et al., U.S. Pat. No. 2,663,689; and the commonly assigned inventions of Ronnie L. Thomas upon which Ser. Nos. 824,753 and 824,754, both filed Aug. 15, 1977, are based.

II. SUMMARY OF THE INVENTION

The present invention is an improved method for cleaning a proppant pack in a fracture in a subterranean formation. The improvement is based on the use of fluoboric acid as the, or one of the, treating fluids. The fluoboric acid is injected into the borehole, and thereafter the fluoboric acid is permitted to at least partially hydrolyze so that the propping agent pack is contacted with the hydrolysis products from the fluoboric acid, which hydrolysis products include, principally, hydrofluoric acid and hydroxyfluoboric acid. In one embodiment of the invention, e.g. where the propping agent is already in place in the fracture, the fluoboric acid is injected into the borehole and thence directly into the prop pack where the hydrolysis is permitted to occur. Where the cleaning is carried out in conjunction with the fracturing operation, the fluoboric acid may be injected into the proppant containing fracture as described in the preceding sentence, or, the fluoboric acid may be injected deep into the formation prior to placement of the propping agent and then at least a portion thereof back flowed into the proppant pack after the pack has been deposited in the fracture.

III. FURTHER DESCRIPTION OF THE INVENTION

The fluoboric acid solution may be prepared in any convenient manner. Ayers, U.S. Pat. No. 2,300,393, for example, teaches preparation of fluoboric acid by mixing boric and hydrofluoric acids. Alternatively, boric acid may be added to ammonium fluoride or ammonium bifluoride in the presence of an approximately stoichiometric amount of HCl. For example, an approximately 8 weight percent solution of fluoboric acid may be prepared by admixing the following:

|  | U.S. | Metric |
| --- | --- | --- |
| Water | 340 Gal | 1.36 m$^3$ |
| Ammonium bifluoride | 500 lb | 240 kg |
| 35 wt % HCl | 97 gal | 0.388 m$^3$ |
| Boric acid | 250 lb | 120 kg |
| Total, approximately | 500 gallons | 2 m$^3$ |

Other variations will be readily apparent to those skilled in the art. For example, another suitable fluoboric acid solution may be prepared employing a mixture of HCl and HF as starting materials, e.g., by admixing the following:

|  | U.S. | Metric |
| --- | --- | --- |
| Water | 370 gal | 1.48 m$^3$ |
| Ammonium bifluoride | 250 lb | 120 kg |
| Aqueous soln. of, by weight, 25% HCl and 20% HF | 84 gal | 0.366 m$^3$ |
| Boric acid | 250 lb | 120 kg |
| Total, approximately | 500 gallons | 2 m$^3$ |

The concentration of fluoboric acid solution is not sharply critical so long as the concentration and amount employed are effective to achieve an observable improvement in treatment of the clays and fines in the fracture pack. Such improvement can be recognized, for example, by improved production, by sustained improved production over a more prolonged period of time than would have been predicted based on previous experience in that field thereby indicating clay stabilization, by laboratory techniques such as flow tests, or, by examination of a prop pack sample using the scanning electron microscope techniques discussed in Society of Petroleum Engineers Paper No. 6007. Generally, however, solutions of from about 1 weight percent or less up to about 48 weight percent HBF$_4$ may be employed. More preferably, the fluoboric acid solution consists substantially of fluoboric acid, i.e., optionally includes functional additives such as a corrosion inhibitor, diverting agent, or the like, but containing (when injected) less than about 2% HCl and less than about 1% HF. Hydrochloric acid accelerates the rate of reaction of the fluoboric acid and therefore is generally not desirable where wells of moderate temperature are being treated. With an initial excess of HF, the system would have some of the disadvantages associated with conventional mud acid. If for some reason it is desirable to accelerate the reaction of the fluoboric acid to reduce shut in time, such as when treating cold wells, e.g. having a bottom hole static temperature of less than about 125° F., it may desirable to include up to about 5% HCl in the fluoboric acid, though care should be taken not to accelerate the reaction so much that proper fluid placement cannot be obtained.

In a typical treatment, a preflush such as toluene, xylene, or the like may be employed, if desired, to clean the wellbore, the fracture, and surrounding formation of organic deposits such as paraffins or asphaltines. Optionally the preflush to remove organic deposits may be followed by a preflush of HCl. Alternatively or in addition, an acid-organic solvent system may be used to dissolve carbonates and organic deposits in the fracture and/or formation. A stage of mud acid may also be used ahead of the fluoboric acid if desired to remove damage near the wellbore, but it is preferred to omit such a step because the mud acid also tends to attack the propping agent.

In the treatment of a fracture containing a proppant prior to injection of the fluoboric acid, the fluoboric acid is injected into the wellbore and thence into the formation. Injection into the formation may be carried out at either a matrix or fracturing rate and pressure. However, the acid is preferably injected at a matrix rate, most preferably at a rate of about ¼ barrel (42 gallon barrel) per 4 feet of perforations (about 33 liters/meter of perforations) which assures that most of the acid will enter the propped fracture and also that migratory fines are not disturbed during the injection. The precise volume employed is not critical. Ideally, a sufficient volume is employed to penetrate the length of the fracture, although fracture volume calculations are at best close approximations. Moreover, since the greatest drawdown is near the wellbore, it is desirable but not essential to treat the entire fracture. Consequently, fracture volume may make complete treatment uneconomical. Therefore, from about 100–200 gallons per foot of pay zone is typically employed.

The fluoboric acid may be displaced from the wellbore if desired with a suitable displacement fluid, e.g., an aqueous ammonium chloride or ammonium borate solution or a weak organic acid solution. Potassium ions are generally to be avoided as they can cause a precipitate to form upon contact with the fluoboric acid. When a weak organic acid is employed, the weak organic acid is selected so as to contribute sufficient ionic character to the water to prevent formation shock, yet not appreciably increase the rate at which the fluoboric acid reacts with the formation. Other suitable displacement fluids, e.g., liquid hydrocarbons, alcohols, and the like may also be employed. Such fluids may also be used as preflushes and/or spacers ahead of the fluoboric acid.

When the fluoboric acid is injected into the formation, the fluoboric acid is left in contact with the prop pack to hydrolyze to HF and various borate species and react with and stabilize the clays and fines in the pack. Except in relatively warm wells (over 300° F.) where as a practical matter the reaction is sufficiently rapid so that it will have inherently occurred before the acid is withdrawn from the fracture by resumed production, the well is usually shut in for a period of time. While some benefits can be realized with somewhat shorter shut in times, optimum benefits are realized where the shut in time are at least about as long as the following (interpolate for temperatures between those stated):

| Bottom Hole Static Temperature | | Minimum Shut-in Time Hours | |
|---|---|---|---|
| °F. | °C. (Calculated from °F. | Preferred | Most Preferred |
| 100 and less | 38 and less | 24 | 96 |
| 110 | 43 | 19 | 76 |
| 120 | 49 | 13 | 52 |
| 130 | 54 | 9 | 35 |
| 140 | 60 | 6 | 24 |
| 150 | 65 | 4 | 16 |
| 160 | 71 | 3 | 11 |
| 170 | 77 | 2 | 8 |
| 180 | 82 | 1 | 5 |
| 190 | 88 | 0.75 | 3 |
| 200–225 | 93–107 | 0.5 | 2 |
| 226–250 | 108–121 | 0.25 | 1 |
| 251–300 | 122–149 | 0.2 | 0.5 |

Longer shut-in times have not been found to be harmful.

In another embodiment, the fluoboric acid may first be injected into the formation at a matrix or fracturing rate, a fracturing fluid carrying a proppant injected thereafter, and the well flowed back to draw the fluoboric acid from the formation back into the newly propped fracture where it is permitted to react, thereby cleaning the newly placed propping agent. Obviously, the foregoing technique will only be suitable to clean the proppant where the well temperature and fracture geometry is such that an appreciable portion of the fluoboric acid can be drawn or flowed back into the fracture unspent. Thus, the production calculated to cause the fluoboric acid to return to the fracture is preferably begun before about 25 percent of the preferred shut in time has elapsed, and most preferably before about 5 percent of the preferred shut in time has elapsed. After at least some of the fluoboric acid has returned to the fracture, the well is shut in for the balance of the time for the desired reaction to occur. Depending on the type of fracturing fluid employed, the acid would also help remove certain polymer residues which might be left in the fracture from the fracturing fluid.

Among the advantages of using fluoboric acid as a prop cleaning treatment fluid is the slow rate of reaction, which permits injection to the extremities of a fracture. Also, the slow rate of reaction makes fluoboric acid much less damaging to the principal propping agent. In addition to providing deep live acid (HF) generation, the treatment also apparently stabilizes any undissolved clays contacted. In contrast to conventional clay stabilizers which have been thought to act by ion exchange or adsorption, laboratory studies indicate fluoboric acid causes an actual chemical fusion of fines and clay platelets, so that they are mechanically much less likely to be disturbed by increased fluid flow. Also, the clays are desensitized and are not thereafter susceptible to swelling or dispersion by otherwise incompatible fluids. Finally, fluoboric acid does not significantly damage the larger propping agent particles.

The present invention is further illustrated by the following well treatment on a producing interval adjacent to a limy sandstone formation with shale streaks. A gelled oil fracturing treatment had been performed through this interval some time previously, using about 110,000 pounds of 20–40 mesh (U.S. Sieve Series) sand. Bottom hole static temperature was in excess of about 200° F. The zone was first treated with 750 gallons of an acid dispersion of the type disclosed in U.S. Pat. No. 3,794,523. Next, 500 gallons of 15% HCl containing a surfactant of the type disclosed in U.S. Pat. No. 4,028,257, a fluid loss additive of the type disclosed in U.S. Pat. No. 3,891,566, and a corrosion inhibitor of the type disclosed in U.S. Pat. No. 3,077,454 (Dowell A200 inhibitor) was injected. The HCl stage was followed by 3000 gallons of 12% HCl—3% HF mud acid containing the same functional additives as the HCl stage. Next, 1000 gallons of a 2% ammonium chloride spacer containing the above mentioned surfactant was injected. Finally, 2000 gallons of 8 percent fluoboric acid was injected containing the above mentioned fluid loss additive and a pyridinium/acetylenic alcohol type inhibitor. The fluoboric acid was displaced to the perforations, with crude oil, i.e. substantially all the fluoboric acid except for about a barrel or so was displaced into the propped fracture. The well was then shut in for over 2 hours to permit the fluoboric acid to react with fines and stabilize clays in the fracture. This treatment was designed and carried out early in the development of the present invention. The mud acid stage would not be utilized in the presently contemplated best mode of carrying out the invention since the mud acid not only reacts with fines, but also tends to damage the propping agent itself.

What is claimed is:

1. A method for increasing the conductivity of a fracture in a subterranean formation penetrated by a borehole wherein at at least some point in time prior to the partial hydrolysis of an effective amount of the fluoboric acid which is injected into the borehole in carrying out the method, the fracture contains a propping agent having siliceous fines or clays dispersed therein, comprising injecting fluoboric acid into the borehole and thereafter permitting the fluoboric acid to at least partially hydrolyze so that at least part of the propping agent pack is contacted with hydrofluoric acid and hydroxyfluoboric acid generated from said fluoboric acid.

2. The method of claim 1 wherein the fracture contains a proppant at the time the fluoboric acid is injected into the borehole, and wherein the fluoboric acid is injected into said fracture.

3. The method of claim 2 wherein the fluoboric acid is injected into the propped fracture and the well is thereafter shut in for a period of time to permit the fluoboric acid to hydrolyze and thereby react with and stabilize the fines and clay platelets in said propping agent pack.

4. The method of claim 3 wherein following displacement of the fluoboric acid into the formation, the well is shut in for a period of time at least about as long as the following times, depending on the bottom hole static temperature of the well:

| Temperature, °F. | Minimum Shut-in Time, Hours |
|---|---|
| 100 and less | 24 |
| 110 | 19 |
| 120 | 13 |
| 130 | 9 |
| 140 | 6 |
| 150 | 4 |
| 160 | 3 |
| 170 | 2 |
| 180 | 1 |
| 190 | 0.75 |
| 200–225 | 0.5 |
| 226–250 | 0.25 |
| 251–300 | 0.2 |

5. The method of claim 4 wherein the shut in time is at least about as long as the following times:

| Temperature, °F. | Minimum Shut-in Time, Hours |
|---|---|
| 100 and less | 96 |
| 110 | 76 |
| 120 | 52 |
| 130 | 35 |
| 140 | 24 |
| 150 | 16 |
| 160 | 11 |
| 170 | 8 |
| 180 | 5 |
| 190 | 3 |
| 200–225 | 2 |
| 226–250 | 1 |
| 251–300 | 0.5 |

* * * * *